MARY V. NEAL, INVENTOR

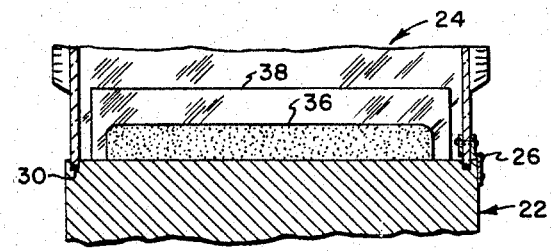
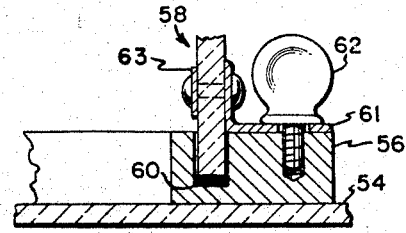
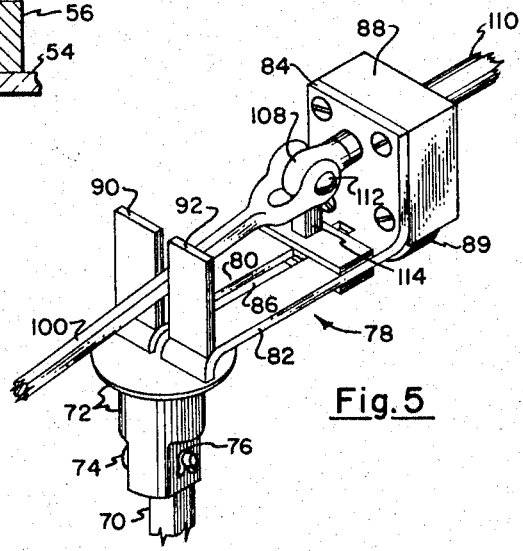
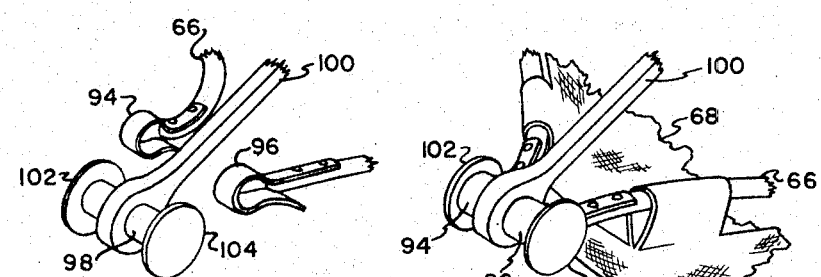

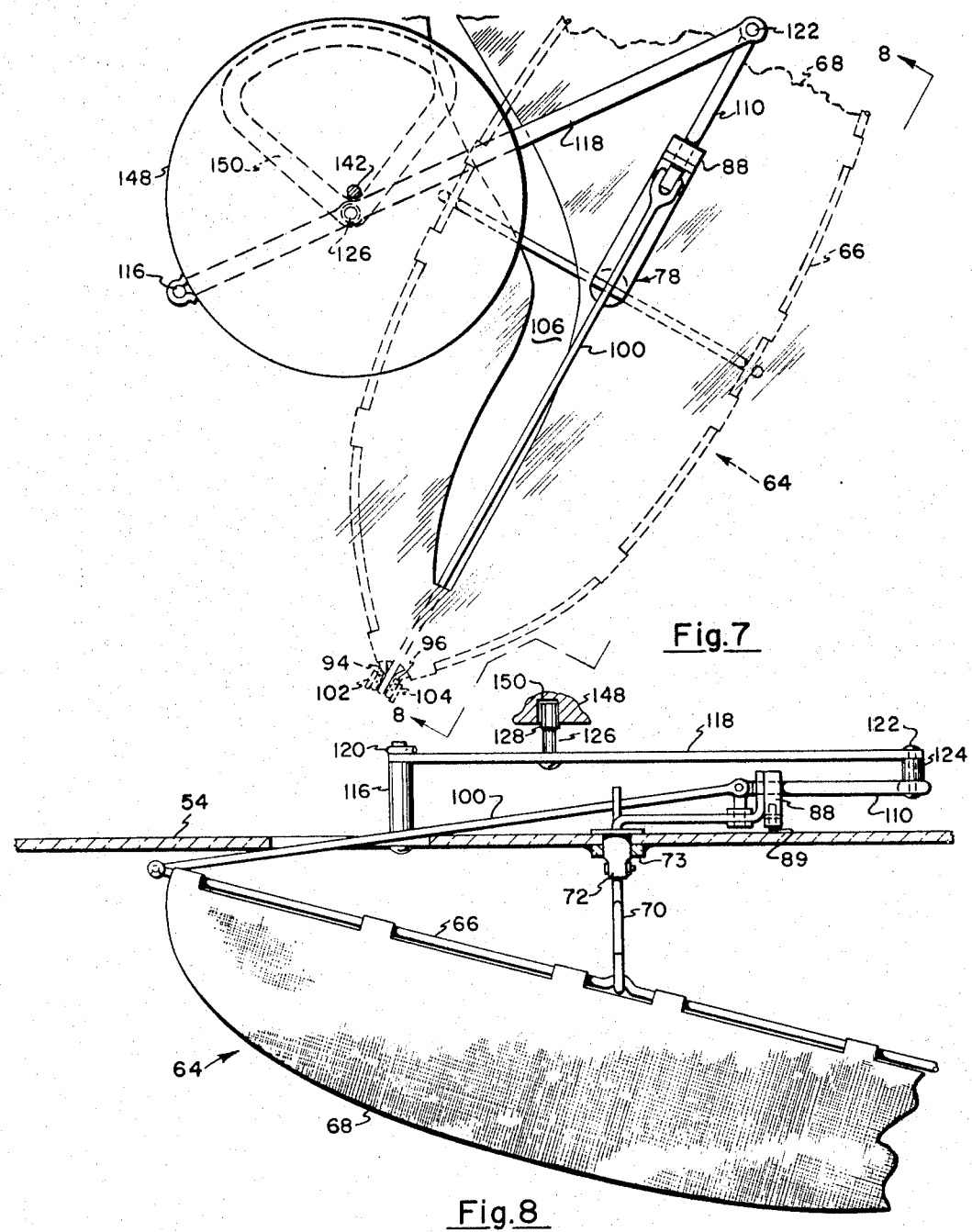

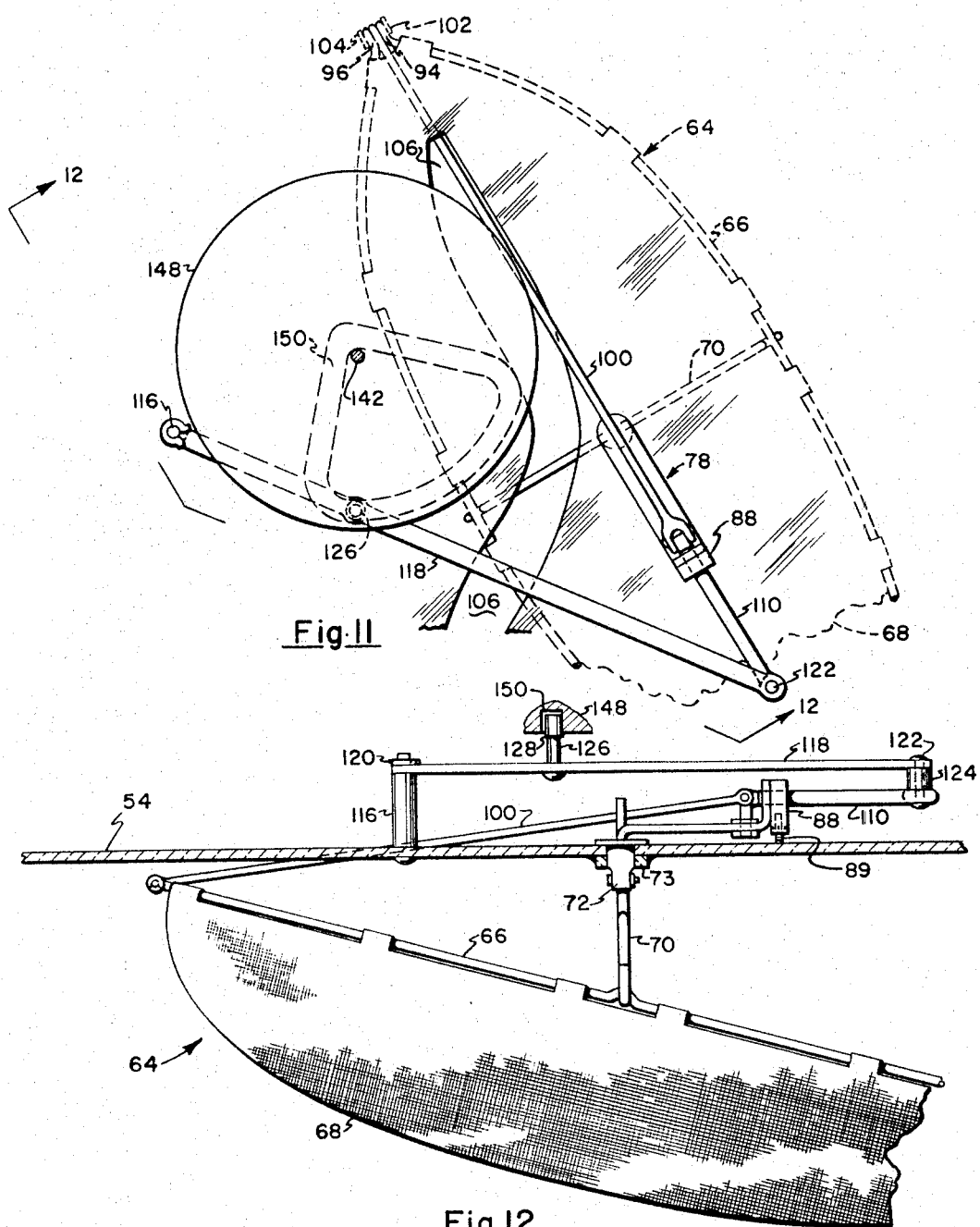

MARY V. NEAL, INVENTOR

BY *Kenyon & Kenyon*
ATTORNEYS

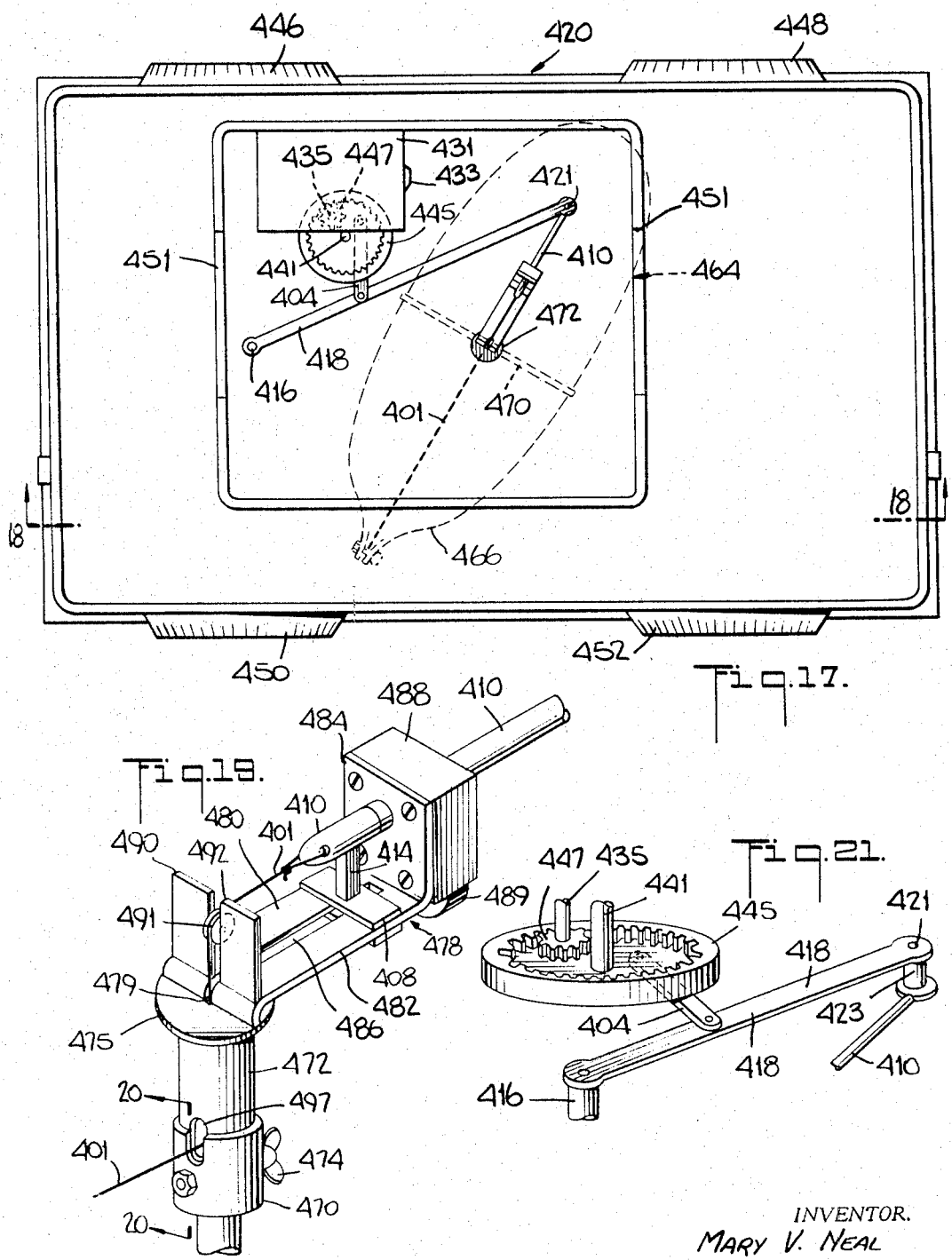

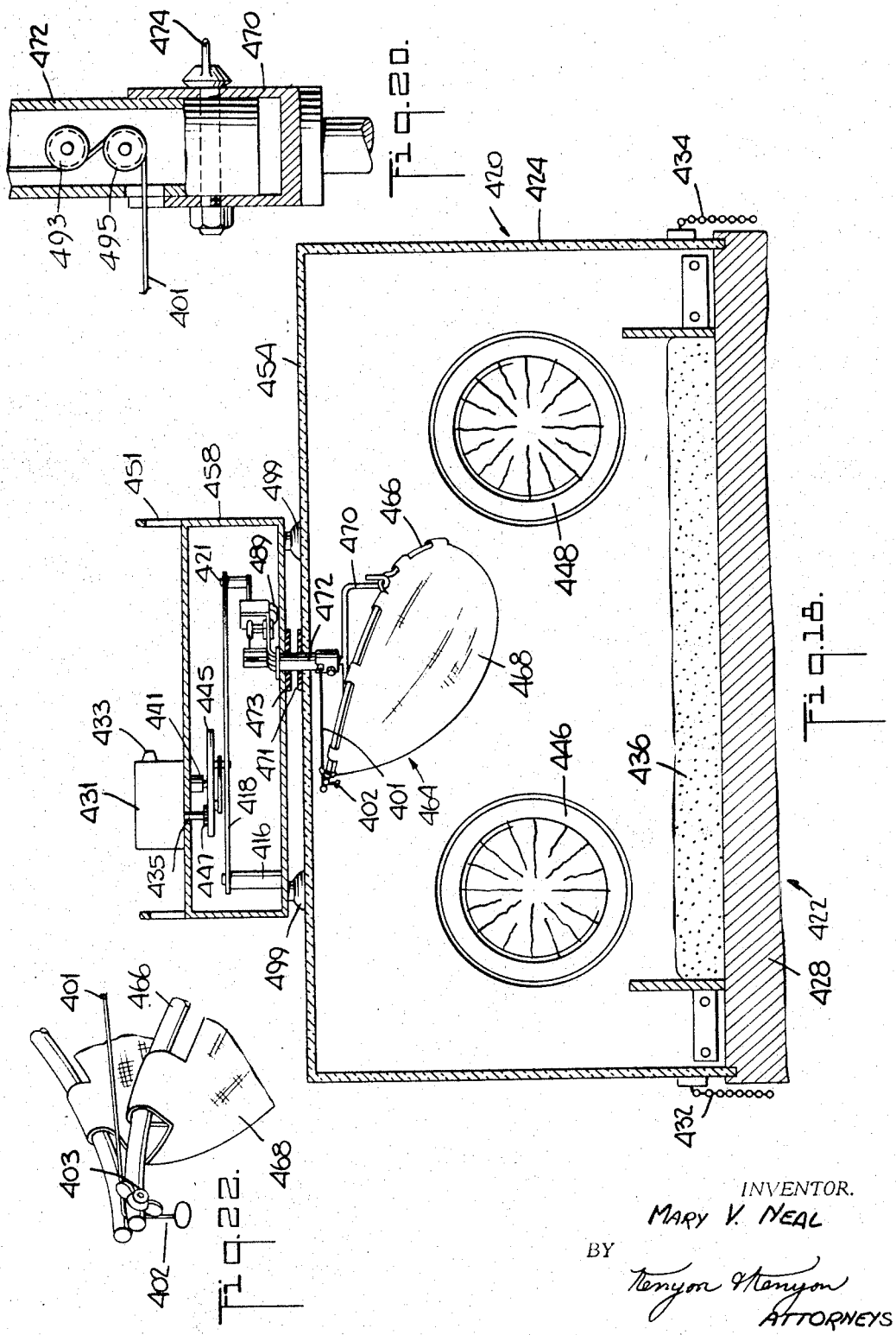

United States Patent Office
3,453,999
Patented July 8, 1969

3,453,999
APPARATUS AND PROCESS FOR ROCKING A HUMAN BEING
Mary V. Neal, 350 1st Ave., New York, N.Y. 10010
Continuation-in-part of application Ser. No. 451,732, Apr. 29, 1965. This application Apr. 22, 1966, Ser. No. 549,760
Int. Cl. A61h 1/00; A47d 9/02, 9/04
U.S. Cl. 128—24      48 Claims

ABSTRACT OF THE DISCLOSURE

An apparatus and method for stimulating a human being's vestibular apparatus by imposing a compound motion pattern upon the human being. The compound motion pattern comprises rocking about a horizontal axis which is transverse to the axis between the head and feet of the human being, and horizontal oscillation about a vertical axis which is perpendicular to said horizontal axis.

---

This application is a continuation-in-part of my abandoned copending application Ser. No. 451,732, for "Apparatus and Process for Rocking a Human Being," filed in the United States Patent Office on Apr. 29, 1965.

This invention relates to an apparatus and process for providing a rocking motion to a human being, especially to an infant. It relates particularly to an apparatus and process for stimulating the vestibular apparatus in a human being by means of a motion pattern, and more particularly, it pertains to an apparatus and process for stimulating the vestibular apparatus in a premature infant.

The vestibular apparatus, located in the vicinity of the inner ear, influences body equilibrium. It is comprised of bony structures which form semicircular canals and of special linings which contain nerve cells. The curved canal structures are arranged at right angles to each other in such a way that they intersect and each is perpendicular to the other two, this arrangement being somewhat similar to two adjacent sides and the bottom of a box which form a corner. Any tilting of this vestibular apparatus, such as occurs when the head is inclined in any direction, stimulates the functioning of the cells within it. Upon this stimulation, the vestibular apparatus both apprises the nervous system of the present position of the head and directs subsequent body motion in an effort to maintain equilibrium. Another influence of stimulation of the vestibular apparatus is noted by eye motion, which is a response of eye muscles. Also, in small animals it has been demonstrated that stimulation of the vestibular apparatus results in an increase in respiratory enzyme production. The possibility exists that it may influence other body systems also.

It has been noted for a long time that some kind of body motion, whether self-imposed (active) or externally-imposed (passive), has a direct bearing on the maintenance of health in nearly all human beings. Body motion has been known to increase blood circulation, to maintain functioning of the muscular system, and to maintain neurological functioning. An unborn infant in his last few months of intrauterine life is active, and is particularly active in the late hours of the day or in the evening. This is noted readily by the pregnant woman and the activity itself is suggestive of a stimulus from the mother to the unborn infant. Failure by the mother to note this intrauterine fetal activity is a warning signal that the unborn infant is in distress. Therefore, an activity of the fetus that can be noted by the mother is considered essential in the life of the unborn infant and it is believed that this activity is related to some stimulation of the vestibular apparatus.

The growth of the infant before birth is an orderly, integrative, and unitary process. After the ninth week of fetal life the vestibular apparatus is anatomically developed and responses of vestibular apparatus functioning are noted by postural responses and the adjustment of eye muscles. The vestibular apparatus functions as an integral part of the growth process and its activity is representative of a reciprocal response. The maturing muscle cells have micromovements that continually stimulate nerve fibers and in turn are stimulated by nerve fibers. This constant activity helps provide the underlying structure of behavior in the growing fetus or unborn infant. This total fetal growth process takes place in the supportive structure of the uterus which provides an almost constant rhythmical pattern of mild contraction and expansion that may influence the growing fetus at two distinct periods of time, in early life as he floats about in the fluid of the uterus, or just before birth when he becomes cramped or crowded in this same environment. The constant mild rhythmical motion pattern of the uterus is a neuromuscular preparation for delivery of the infant.

At birth the infant leaves this protected environment and is placed in a new environment in which he is subjected to only intermittent externally-imposed motion. The physiological adjustment to this new environment, in which the infant must function under his own self-imposed motion, is a critical period in the life of the infant. In an effort to help the infant in this adjustment several types of externally-imposed motion devices have been proposed.

Many infants have difficulty in establishing the necessary respiratory functioning that is essential to sustain life. It has been proposed in the prior art that a rocking motion would be helpful to this infant. One type of rocking provides a single tilting motion at the mid-axis of the body, the motion helping to provide an alternate compression and distention of the lungs and thereby assist respiration. Other prior art apparatus has been designed to provide tilting movement about transverse and longitudinal axes for the premature infant confined to an incubator. The object of this movement is to stimulate the life processes, specifically respiration and blood circulation. Rocking beds or rocking cradles have also been designed to provide longitudinal reciprocating motion only, oscillation about a vertical axis at one end of the bed, swinging about a longitudinal axis only, or swinging about a transverse axis only.

Additionally, rocking beds or rocking cradles have been designed to provide a number of compound motions, for example: swinging or pitching about a transverse axis and swinging about a longitudinal axis (U.S. Patent No. 2,590,920 to Beegle); oscillation or tilting about a transverse axis and slight reciprocation along the longitudinal axis (U.S. Patent No. 2,696,207 to Bushnell); tilting about a transverse axis and rocking about a longitudinal axis (U.S. Patent No. 2,808,828 to Rubin); tilting or pitching about a transverse axis and rocking or rolling about a longitudinal axis (U.S. Patent No. 2,869,538 to Hawk); and vertical reciprocation, sliding reciprocation along the longitudinal axis and tilting about a transverse axis (U.S. Patent No. 2,897,518 to Paramore). None of the foregoing bed or cradle motions however, neither single nor compound, has been taught as providing a motion schedule or pattern suitable to stimulate or excite the entire vestibular apparatus, and indeed none of them would be wholly suitable for this purpose.

As pointed out hereinbefore, the unique structure of the canals of the vestibular apparatus form a labyrinth of curved bony planes which are at right angles to each other. In addition to this bony structure the special lining of the vestibular apparatus is comprised of nerve fibers in hair-like structures and small bony structures that are external to the curved bony planes of the labyrinth. Both labyrinth and lining construction are in apposition to the two planes that may be assumed by the body, vertical and horizontal. Only compound motion comprising horizontal angular oscillation and vertical rocking of the body would be capable of changing the plane position of the labyrinth and linings and thereby achieving excitation of the vestibular cells particularly and stimulation of the entire vestibular apparatus generally. Neither the process effecting such stimulation in the born and independently existing human being by motion of the kind described nor apparatus for imposing this motion on a human being, especially a premature infant, are known to the prior art.

The apparatus and process of the present invention are intended specifically to provide a compound motion in the horizontal and vertical planes suitable to stimulate the entire vestibular apparatus and, on the basis of the particular motion provided, are distinguishable from the prior art examples mentioned above. In a preferred process embodiment the present invention comprises simultaneous steps of imposing angular horizontal oscillating and vertical rocking motion upon a human being, especially the premature infant, to achieve the inventive object of complete vestibular stimulation. The most desired angular ranges of oscillation and rocking are about 120° horizontally and about 30° vertically.

In its preferred apparatus embodiments described herein, the present invention has several features which provide for ease in handling and installation. It is light in weight; its drive mechanism is compact and amenable to enclosure; and the whole apparatus is conveniently mounted onto an incubator, over a crib, or over a bed. It is indeed an object of this invention to provide a compact rocking apparatus that may be fitted onto or into an incubator or over a crib or a bed. It is a further object of the present invention to provide such an apparatus which, complete with its drive mechanism, may be moved easily from one incubator to another for use where needed with only a relatively minor amount of modification required of the incubators with which it is to be capable of use.

The kind of support provided for an infant while motion is imposed upon him is an important consideration. An infant rests best when he has full body support while at the same time retaining freedom of self-imposed bodily movement. In a preferred apparatus embodiment of the present invention a framed hammock assembly for the infant which is capable of providing support of this nature is suspended within an incubator to have the desired degrees of rotational freedom about vertical and horizontal axes with the suspension means running back to and forming part of the aforementioned drive mechanism. It is indeed an object of this invention to provide a comfortable total-body support for the infant while he receives an imposed rocking motion of the kind described.

Infants are confined to incubators for the specific purpose of providing them with a constant temperature, controlled humidity, and increased oxygen concentration of their immediately surrounding atmosphere. These provisions or conditions of atmospheric environment are important for the maintenance of an infant's life and vitality. In one apparatus embodiment of the present invention the drive mechanism is mounted directly on the top panel of the incubator, and has a stroking rod extending through an elongated unsealed opening in this panel to connect with the frame of the aforementioned hammock suspended rotatably within the incubator. A shielding enclosure adapted to fit over the drive mechanism and extend beyond the boundaries of the aforesaid opening is demountably fitted onto the top panel of the incubator and in a sense forms an extension of the incubator so that the drive mechanism actually works within the desired incubator atmosphere communicating with it through the opening. In another apparatus embodiment of the present invention, a cord-like stroking-line connected to the frame of the hammock is used instead of a stroking rod. In this embodiment, two intermeshed gears which may be driven either by a motor, a hand operated crank or by an equivalent means move linkages in a desired motion pattern, and the linkages in turn move both the stroking-line and also the means used to suspend the hammock, thereby providing the desired compound motion pattern for the hammock. In this embodiment, a portion of the apparatus employed to move the hammock in the desired motion pattern is contained within a second enclosure mounted on the top panel of the incubator, and only a single opening is required in the incubator's top panel, and it is sealed to mitigate against leakage through the opening of the atmosphere within the incubator. In this embodiment as well as in the embodiment described in the forepart of this paragraph, it is an object of the present invention to provide a rocking apparatus which will not interfere with or in any way cause a change in the atmospheric conditions within an incubator with which it is associated, and which does not require any complicated sealing means for the maintenance of these conditions.

The foregoing and other objects and advantages of the present invention as well as its nature and substance will be more clearly perceived and fully understood by referring to the following description and claims taken in connection with the accompanying drawings in which:

FIG. 3 represents a fragmentary view in sectional elevation of the incubator of FIG. 2 taken along line 3—3 therein looking in the direction of the arrows at the level of the incubator deck and bedding;

FIG. 4 represents an enlarged fragmentary view in sectional elevation of the connection made between the shielding enclosure of the drive mechanism and the top panel of the incubator taken along line 4—4 in FIG. 1 looking in the direction of the arrows;

FIG. 5 represents an enlarged perspective view of the hammock yoke suspension means and the guidance means of the upper end of the hammock frame vertical stroking rod of the apparatus of FIG. 1;

FIG. 6A represents an enlarged perspective view of the lower end of the hammock frame vertical stroking rod with the hammock frame just disconnected therefrom;

FIG. 6B represents an enlarged perspective view of the lower end of the hammock frame vertical stroking rod with the hammock frame connected thereto;

FIG. 7 represents an enlarged fragmentary plan view of the apparatus of FIG. 2 taken along line 7—7 therein looking in the direction of the arrows, and showing the hammock assembly thereof in one extreme position of its horizontal oscillation;

FIG. 8 represents a view in side elevation of the apparatus of FIG. 7 taken along line 8—8 therein looking in the direction of the arrows;

FIG. 11 represents a view similar to FIG. 7 but showing the hammock assembly in the opposite extreme position of its horizontal oscillation;

FIG. 12 represents a view in side elevation of the apparatus of FIG. 11 taken along line 12—12 therein looking in the direction of the arrows;

Figure 13:
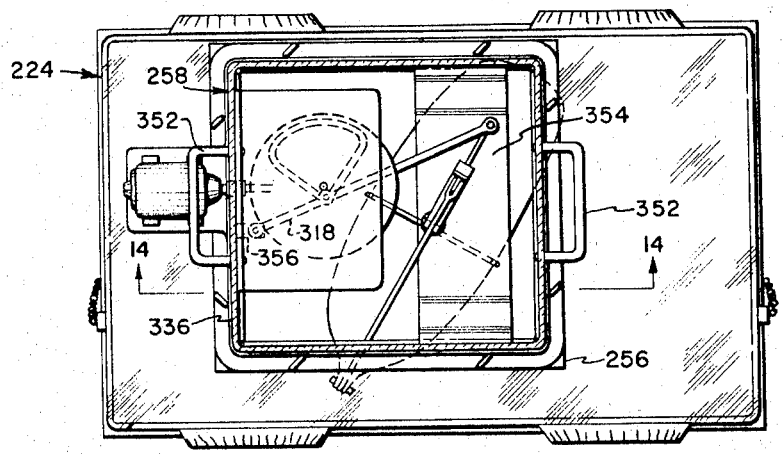
Figure 14:
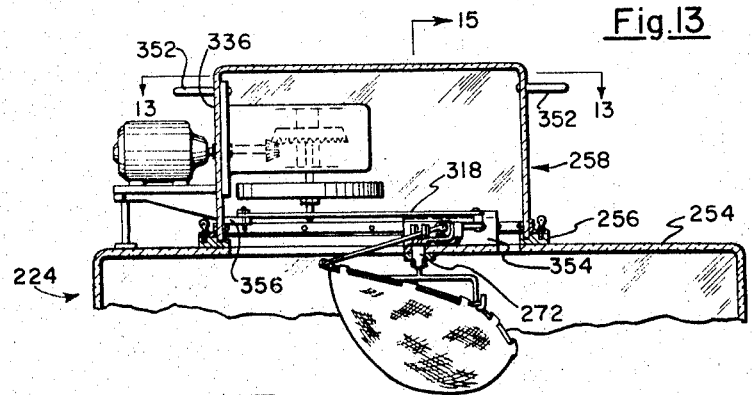
Figure 15:
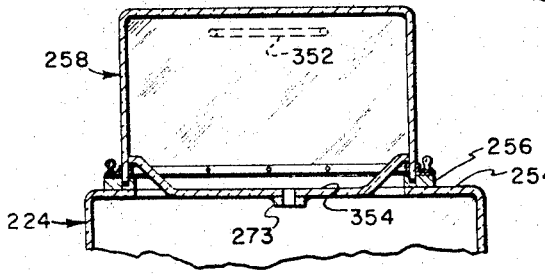
Figure 16:
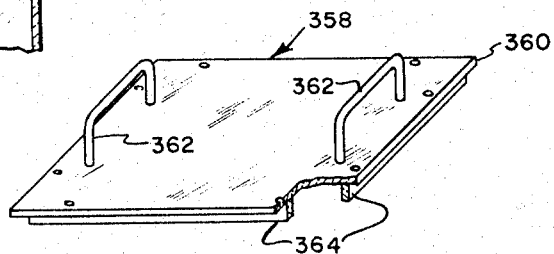

FIG. 13, taken along line 13—13 in FIG. 14 looking in the direction of the arrows, represents a sectional plan view of a second and equally preferred apparatus embodiment of the present invention installed on an incubator top panel, this embodiment being one which may be moved easily complete with its drive mechanism from one incubator to another;

FIG. 14 represents a view in sectional elevation of the apparatus of FIG. 13 taken along line 14—14 therein looking in the direction of the arrows;

FIG. 15 represents a view in sectional elevation of the apparatus of FIGS. 13 and 14 taken along line 15—15 in FIG. 14 looking in the direction of the arrows with the drive mechanism, hammock support yoke, and hammock assembly removed;

FIG. 16 represents an isometric view, partly broken away, of a cover or closure plate used in connection with incubators adapted to receive the apparatus embodiment of this invention shown in FIGS. 13, 14 and 15;

FIG. 17 represents a plan view of a third and, in some respects a most preferred apparatus embodiment of the present invention showing a hammock extending beneath the top panel of an incubator;

FIG. 18 represents a view in sectional elevation of the apparatus of FIG. 17 taken along line 18—18 thereof, looking in the direction of the arrows;

FIG. 19 represents an enlarged perspective view of a portion of the means employed for suspending and moving the hammock shown in FIGS. 17 and 18;

FIG. 20 represents a fragmentary cross-sectional view of a cylindrically-shaped portion of the means shown in FIG. 19 along the line 20—20 thereof, looking in the direction of the arrows, FIG. 20 showing a pair of sheave wheels and a cord-like stroking-line employed for moving the frame of the hammock shown in FIGS. 17 and 18.

FIG. 21 represents an enlarged perspective view of a gear arrangement employed in the apparatus of FIG. 17 connected to an associated linkage for transmitting desired motion patterns from the gear arrangement to the frame of the hammock shown in FIGS. 17 and 18; and FIG. 22 represents a fragmentary perspective view of one end of the hammock frame shown in FIGS. 17 and 18, showing a cord-like stroking-line employed for moving the frame of the hammock.

Figure 1:
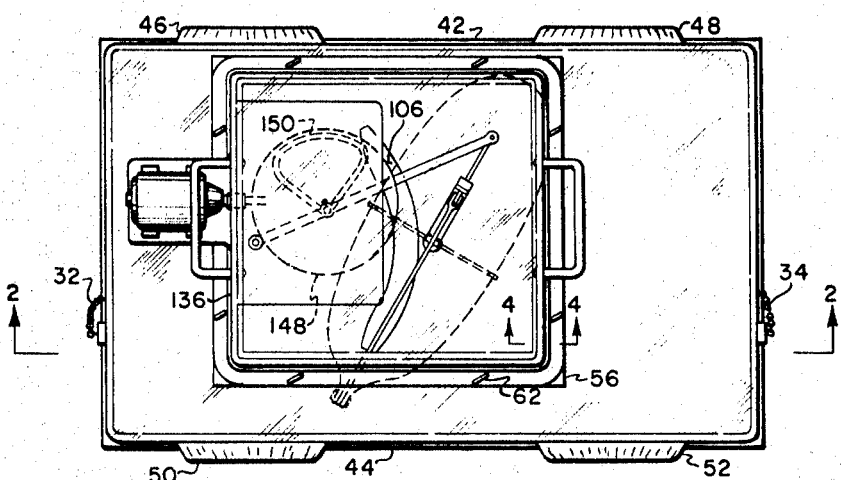
FIG. 1 represents a plan view of an apparatus embodiment of the present invention installed on an incubator top panel.
Figure 2:
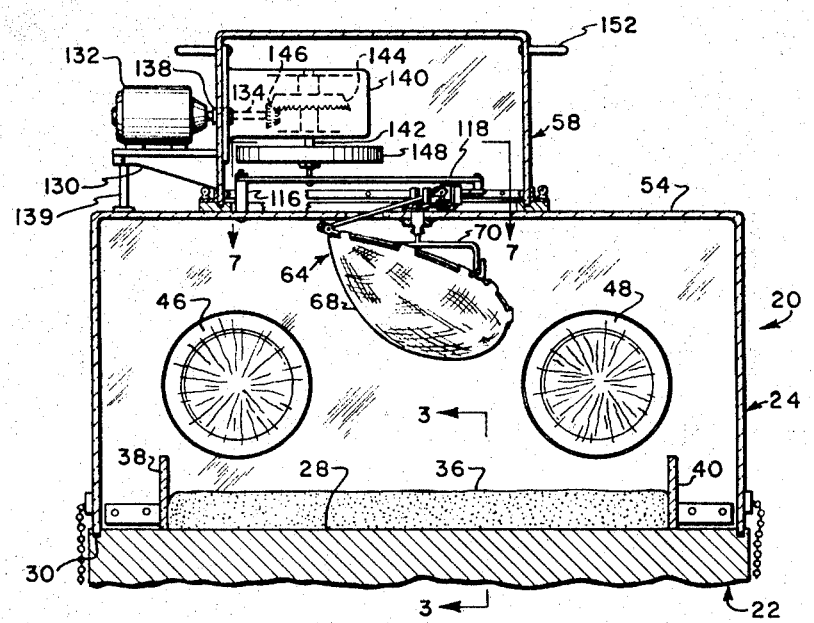
FIG. 2 represents a view in sectional elevation of the apparatus of FIG. 1 taken along line 2—2 therein looking in the direction of the arrows.

Referring now to the drawings in detail, especially FIGS. 1, 2 and 3 thereof, an incubator for human infants is generally designated 20. This incubator, of a substantially conventional nature, comprises a base structure generally designated 22, shown fragmentarily, which is surmounted by a Plexiglas enclosure generally designated 24. Enclosure 24 is hingedly attached to the base structure by means of a piano-type hinge 26, and its bottom edges fit into a groove running all around the base structure deck 28. Within this groove there is a gasket 30 which, as compressed by the weight of Plexiglas enclosure 24 and structure mounted on this enclosure, forms a substantially gas-tight seal between enclosure 24 and base structure 22. This gasket may be of any suitable kind, and in the normal usage of the incubator will only be required to maintain a seal in the face of very small pressure differences from inside enclosure 24 to the surrounding atmosphere. Chains 32 and 34 are connected between base structure 22 and enclosure 24 at either end of incubator 20, and limit the extent to which the enclosure can be rotated up and back away from the base structure on hinge 26.

On base structure deck 28 there is a mattress 36 located between appropriately positioned upright members 38 and 40. In each of the side vertical panels 42 and 44 of Plexiglas enclosure 24 there are two access ports, ports 46 and 48 and ports 50 and 52 occurring in panels 42 and 44 respectively. Ports 46 and 50 are located substantially opposite from each other as are ports 48 and 52. These ports, which are normally closed by flexible sleeves subject to being opened when desired, are the means whereby and wherethrough access is obtained to the interior of the incubator when Plexiglas enclosure 24 is in its lowered or working position as shown in FIGS. 1, 2 and 3. As a matter of convenience, the ports are generally in positions such that easy access to mattress 36 may be obtained through them for the handling of and general caring for an infant on the mattress. The incubator is provided with various utilities, not shown, particularly including heating means, a source of oxygen, and moisturizing means whereby proper humidity is maintained along with proper oxygen content in the atmosphere in enclosure 24. Additionally, air supply and exhaust means are provided to maintain refreshment and circulation of the incubator atmosphere. These utilities are generally located within base structure 22, and have outlet and circulation openings as necessary in deck 28 at the head and foot of mattress 36 beyond uprights 38 and 40.

Referring still to FIGS. 1, 2 and 3, and now considering FIGS. 4, 5, 6A and 6B with them as necessary, top panel 54 of incubator enclosure 24 is fixedly and substantially gas-tightly fitted on its upper surface as by cementing with a grooved or channel-like rectangular frame 56, details of which appear in FIG. 4. This frame is adapted to have removably fitted into it an enclosure generally designated 58 which, like enclosure 24, may be made of Plexiglas. Lying within the groove or channel in frame 56 is a strip of gasket material 60 against which the lower edges of enclosure 58 are actually seated, and which provides a substantially gas-tight seal between these edges and the frame. Extending all around and fixedly fastened to the outer periphery of enclosure 58 near its lower edges is an angle flange 61. A plurality of thumb screws 62 extend through clear holes in this flange and thread into matching tapped holes in frame 56. Permanent attachment of frame 61 to enclosure 58 itself is made by a plurality of rivets passing through the enclosure side panels to a backing strip 63 which extends all around the inner periphery of the enclosure. While thumb screws 62 are effective to urge enclosure 58 down onto gasket 60 by the lower sides of their heads bearing on flange 61, their principal function is to hold this enclosure and machinery mounted on it in place with respect to incubator enclosure 24 when the latter enclosure is swung up and back away from incubator base structure 22 on hinge 26. Additionally, the thumb screws prevent any upsetting of enclosure 58 by the overhung weight of a drive motor supported from this enclosure. The positive gas pressures developed within enclosure 58, if any, are very small, and sealing against them can be effected to some extent by just the weight of enclosure 58 and its attachments bearing down on gasket 60.

In this embodiment a framed hammock assembly generally designated 64 is suspended within incubator enclosure 24 fairly closely below top panel 54 and above mattress 36 therewithin. Assembly 64 comprises a frame 66 on which is supported a hammock member 68. The hammock frame passes through a plurality of loops along the upper edge of the hammock member. The hammock member itself may be made of canvas or any other suitably strong yet pliable material. The length of assembly 64 from end to end is sufficient that this assembly can accommodate a human infant in a semi-fetal position. For example, hammock assembly 64 may be approximately fifteen inches long and about five inches deep. Although it is contemplated that hammock member 68 may be removably attached to frame 66 as by snaps or hooks rather than sewn loops, it is particularly within the contemplation of the present invention that the illustrated loops along the top edge of the hammock member through which frame 66 passes are sewn around the frame fairly closely and essentially permanently. Hammock assembly 64 may thus be manufactured as an entire, replaceable unit which can be given sterile packaging initially and which can be washed and sterilized later after use without any need or attempt to separate hammock member 68 and frame 66. The frame and its spring clip attachments (see FIGS. 6A and 6B) would be fabricated of stainless steel, bronze, or other material not easily susceptible to corrosion.

Suspension of hammick assembly 64 is effected by means of a yoke 70. The legs of this yoke, which extend downwardly, have upward and outward U-bends at their lower ends through which pass opposite sides of hammock frame 66 as it itself is formed around into shape to support and distend hammock member 68. At the engagement points of hammock frame 66 with the legs of yoke 70, about half way along the frame on either side thereof, the frame is at least somewhat upwardly jogged, as may be seen clearly in FIG. 8, so that definite bearing or rocking points are established for the frame on the yoke legs; that is, bearing points are established such that the frame will not be able to slide one way or another through the U-bends on the yoke legs as the hammock assembly is rocked on the yoke. These jogged regions of frame 66 provide also for torque transmission between the hammock assembly and the yoke in the horizontal plane. The central stem of yoke 70 is square in transverse cross section and extends well upwardly into a square hole within journal member 72 in which it has a close sliding fit for torque transmission purposes, and from which the yoke is suspended by means to be described.

Journal member 72 comprises an upper, plate-like portion of relatively large diameter and a lower cylinder-like portion having a diameter at least somewhat smaller than that of the upper portion of the member. The lower portion of journal member 72 extends downwardly through a hole in top panel 54 of incubator enclosure 24, in which hole it has a close but free turning fit. It has a similar fit in bearing collar 73, shown particularly in FIG. 8, which is fastened to the underside of panel 54. This collar, like channel frame 56, may be made of Plexiglas and attached to the incubator enclosure top panel by cementing or in any other suitable way. The upper plate-like portion of the journal member rests on the upper surface of panel 54 and thereby provides support for the whole journal member and parts and assemblies suspended from it. The purpose of bearing collar 73 is to provide lateral bearing surface in addition to that of the wall of the hole in panel 54 to inhibit tilting of journal member 72. An anti-tilting effect may also be achieved by having collar 73 removably mounted, as by radial screws, on journal member 72 closely below panel 54 rather than on the panel itself to turn with the journal member against the panel.

In its extent below bearing collar 73, two opposite flat portions are machined or otherwise formed on journal member 72 essentially parallel to a pair of wall surfaces of the square axial hole within it, and the journal member is there drilled transversely to accommodate a smooth, headed pin 74 which projects oppositely beyond the journal member. In this projection the pin is grooved circumferentially to accommodate a retaining snap ring 76. The square stem of yoke 70 is drilled transversely with a hole of the same diameter as that in the journal member, and disposed to come into alignment with the latter hole when the yoke stem is pushed up into the square vertically-extending hole in the journal member. Thus pin 74 may be inserted transversely through both journal member 72 and the stem of yoke 70, and thereafter have snap ring 76 applied onto it, to suspend the yoke from the journal member.

As may be seen particularly in FIG. 5, journal member 72 is surmounted by and has fixedly attached to it a crank or turning member generally designated 78. This member comprises two substantially horizontally extending leg portions 80 and 82, which are each bent down at one end to attach to the top of journal member 72, and an upwardly extending trunk or flange portion 84. Leg portions 80 and 82 are separated by a slot 86 of determinate width. A bearing member 88 is attached by screws and dowels to the outer surface of trunk portion 84 and there is a hole through this portion of essentially the same size as and in accurate axial alignment with the hole in the bearing member. This continuous hole is located essentially centrally with respect to slot 86. Mounted rotatably within bearing member 88 and extending below it is a roller member 89, shown particularly in FIG. 8, which may have the structure of a ball bearing. This roller rides on the upper surface of incubator enclosure top panel 54, and provides support for the portion of turning member 78 overhung beyond journal member 72. An arcuate metal strip, not shown, may be provided on the upper surface of panel 54 to act as a track for roller member 89. Upright guide members 90 and 92 are attached fixedly to leg portions 80 and 82 just about where these portions bend down at their feet to be joined to journal member 72. It will be appreciated that when a turning motion in a horizontal plane is imposed upon crank 78 this motion will be transmitted to yoke 70 through journal member 72 and from the yoke to hammock assembly 64.

As may be seen particularly in FIGS. 6A and 6B, the ends of hammock frame 66 have spring clips 94 and 96 riveted or otherwise affixed to them. These clips are adapted to engage with connecting pin 98 extending through on either side of the enlarged lower end of hammock frame vertical stroking rod 100. The ends of pin 98 are fitted with small discs or plates 102 and 104 so that the clips 94 and 96 cannot slide outwardly along and off the pin when they are engaged with it. The engagement of clips 94 and 96 on connecting pin 98 is such that these clips have a free turning or rotational fit on this pin, and may be easily connected to and disconnected from it. Stroking rod 100 extends slantwise upwardly through an elongated, arcuate hole 106 in top panel 54 of incubator enclosure 24. It is to be noted that this hole lies entirely within the inner boundary of channel frame 56 on panel 54.

After passing through hole 106, hammock frame vertical stroking rod 100 continues slantwise upwardly and has a close but easy sliding fit between guide members 90 and 92 on legs 80 and 82 of crank 78. The upper end of the rod beyond the guide members is bifurcated and fits around a crosshead member 108 into which one end of horizontal stroking rod 110 is screwed or otherwise fastened. The horizontal stroking rod and the crosshead member are pivotally connected by means of wrist pin or screw 112. Horizontal stroking rod 110 has a close sliding fit in bearing member 88 and the continuation of this bearing through the hole in flange or trunk portion 84 of crank member 78. An alignment maintenance or crosshead slider structure 114 is formed integrally with crosshead member 108. This structure comprises a vertical element which extends downwardly from the crosshead and passes all the way down through slot 86 between crank member leg portions 80 and 82, and has a close sliding fit with respect to the edge surfaces of these leg portions which define the slot. The structure comprises additionally two horizontal elements affixed to the vertical element respectively above and below the crank member leg portions 80 and 82. These horizontal elements have close sliding fits on the upper and lower surfaces of the crank member leg portions. In general, the purpose of crosshead slider structure 114 is to prevent any significant bending thrust from being exerted on horizontal stroking rod 110 by vertical stroking rod 100.

A cradle stroking arm pivot post 116 is mounted on and extends above top panel 54 of incubator enclosure 24. It is to be noted that this post is located within the inner boundary of channel frame 56 on panel 54, and with respect to the hole in this panel through which journal member 72 extends lies on a line which is essentially parallel to side vertical panels 42 and 44 of enclosure 24. Post 116 provides pivotal support for one end of stroking arm 118 which is retained on this post by snap ring 120 as seen most clearly in FIGS. 8, 10 and 12. At its other end, arm 118 is connected to the end of horizontal stroking rod 110 distant from vertical stroking rod 100 by means of pivot pin 122 and spacer sleeve 124. It may be seen that as arm 118 is pivoted in one direction and then the other about pivot post 116 through at least a limited range of angular motion, horizontal stroking rod 110 will be moved through bearing member 88 alternately toward and away from the vertical pivot axis of journal member 72, and will at the same time impose an alternating torque on crank member 78 which will cause turning motion of journal member 72 and yoke 70 first one way and then the other.

Assuming that the framed hammock assembly 64 is suspended from yoke 70, the turning motion of the yoke will cause horizontal oscillation of the hammock assembly. Assuming further that vertical stroking rod 100 is connected between hammock frame 66 and crosshead member 108 on horizontal stroking rod 110, the sliding motion of rod 110 first one way and then the other through bearing 88 will cause the framed hammock to be rocked up and down around its pivot points on the U-bends of the legs of yoke 70. Thus, an overall compound motion of horizontal angular oscillation and vertical rocking is provided to the framed hammock and any infant lying within it. A cam follower pin 126 (see FIG. 8) is affixed to and extends upwardly from stroking arm 118, and carries a cam follower bearing 128. It is through this pin and bearing, together constituting a cam follower means, that pivoting motion first one way and then the other is imposed upon the stroking arm from and by a drive mechanism mounted in and on enclosure 58.

A motor support bracket 130 is affixed to an exterior side panel surface of enclosure 58 as shown in FIGS. 1 and 2. Electric motor 132 which is mounted on this bracket has its output shaft 134 extending through the adjacent panel 136 of enclosure 58, passing immediately through an essentially gas-tight sealing means or gland 138 set in panel 136. Bracket 130 may have a strut or pedestral member 139 hinged to its underside and adapted to be swung down against the upper surface of incubator enclosure top panel 54 to help support the weight of motor 132 overhung from enclosure 58. Directly within enclosure 58, shaft 134 enters a gear housing 140 which is mounted against the interior surface of panel 136, and substantially overhangs stroking arm 118. A shaft 142 is vertically and rotatably aligned and supported within housing 140, and extends down through the bottom panel of this housing. Within the housing itself, shaft 142 carries and has fixedly attached to it a bevel gear 144. This gear is meshed with a bevel gear 146 carried on the inner end of motor output shaft 134. The portion of vertical shaft 142 extending below gear housing 140 carries and has fixedly attached to it cam 148. In overall aspect this cam may be of circular or disk-like form and centrally mounted on shaft 142. The working cam surfaces, however, are those of somewhat pear-shaped groove 150 which is cut in the lower plane surface of the cam quite eccentrically to the axis of rotation of the cam which is the axis of shaft 142.

Cam follower bearing 128 mounted on stroking arm 118 by means of cam follower pin 126 rides in groove 150. This groove is so shaped and laid out with respect to the axis of shaft 142 and the axis of this shaft is so disposed with respect to the axis of pivot post 116 that rotation of cam 148 by motor 132, acting through the illustrated shafts and train of gears, will cause stroking arm 118 to be swung back and forth through an arc more or less equally divided on either side of a line connecting the axes of pivot post 116 and journal member 72.

The various drive mechanism elements within enclosure 58, including those elements mounted on top panel 54 of incubator enclosure 24, should be fabricated of plastic, fibrous, or non-corroding metal materials, as most convenient and appropriate. This is because these elements are all susceptible to exposure to a moist working atmosphere on account of the free communication between the interior of enclosure 24 and that of enclosure 58 through arcuate hole 106. Where motor 132 mounted on the exterior of enclosure 58 is indeed an electric motor it is preferably of an explosion-proof construction. This motor need not, however, be an electric motor of any kind for purposes of the present invention. It may, for example, be a pneumatic motor, a hydraulic motor, or a spring motor. Further, within its broadest scope, the present invention will not be defeated if no motor at all be used, but rather a simple hand crank is provided on shaft 134 so that the drive mechanism for framed cradle assembly 64 may be powered by human agency.

It is to be noted that upon thumb screws 62 being backed off out of threaded engagement with frame 56 enclosure 58 may be lifted up out of the channel frame, and thus away from incubator enclosure 24. A pair of rungs or handles 152 are provided on enclosure 58 for this purpose. As enclosure 58 is lifted, the drive mechanism of the apparatus embodiment of the present invention shown in FIGS. 1 and 2 extending from motor support bracket 130 all the way to cam 148 will come up with it. Cam follower bearing 128 will simply pull out of cam groove 150 as enclosure 58 is lifted. Mechanism remaining in immediate association with incubator enclosure 24 will be that extending from framed hammock assembly 64 up to stroking arm 118, including the cam follower means mounted on the upper surface of this arm.

From the foregoing it will be apparent to those skilled in the art that in a nursery installation where there are a plurality of incubators in each of which it may be desired to rock infants from time to time according to the present invention, each incubator may be provided permanently with a train of mechanism extending from framed hammock assembly 64 to stroking arm 118 while only a single enclosure 58 with its associated drive mechanism will be required with this enclosure being moved about from incubator to incubator as needed and desired. Of course, each incubator would be provided permanently with a properly positioned channel frame 56 on the upper surface of its top panel and a bearing collar 73 below this panel. It would be provided also with suitable removable sealing means to fit around vertical stroking rod 100 to close arcuate hole 106, and thereby prevent undesired atmospheric leakage into or out of the incubator at such times as the incubator did not have enclosure 58 mounted on it. Thus no incubator need be disabled from normal usage, that is, usage in which an infant is placed on mattress 36 for treatment, observation, or care in the absence of enclosure 58 and the mechanism immediately associated with it being installed on the incubator. When this enclosure and its associated mechanism are indeed to be installed upon an incubator it will only be necessary to remove the sealing means around stroking rod 100 to open up arcuate hole 106; bring stroking arm 118 and cam 148 into such rotational alignment that cam follower bearing 128 will enter easily into cam groove 150; lower enclosure 58 down into proper seating position on its gasket 60 in the groove of channel frame 56, and finally pass thumb screws 62 through the clear holes provided for them in flangle 61 on enclosure 58 into the matching tapped holes in the channel frame, and thread them down reasonably tightly onto the flange.

Another possibility for flexible use of the invention as so far illustrated and described in that in a multi-incubator nursery an enclosure 58 and an enclosure 24 having associated with them all mechanisms shown in FIGS. 1 and 2 would be substantially permanently joined to each other, and usually not installed upon the base structure 22 of any particular incubator. All incubators in the nursery would be of essentially conventional kind; that is, they would have no framed hammocks and associated mechanisms for driving the same mounted on or in them; the top panels 54 of their enclosures 24 would not be cut with any arcuate holes 106, nor would these panels be provided with channel frames 56 or bearing collars 73. Should it be desired to rock an infant in a given incubator, the chains 32 and 34 of that incubator would be cast loose from its enclosure 24; the pin of its piano-type hinge 26 would be pulled; the conventional enclosure 24 lifted away from incubator base 22; the special incubator enclosure having the illustrated apparatus of this invention associated with it set in place on the base structure; the hinge pin reinserted, and the loose ends of chains 32 and 34 connected to the special enclosure.

Figure 9:
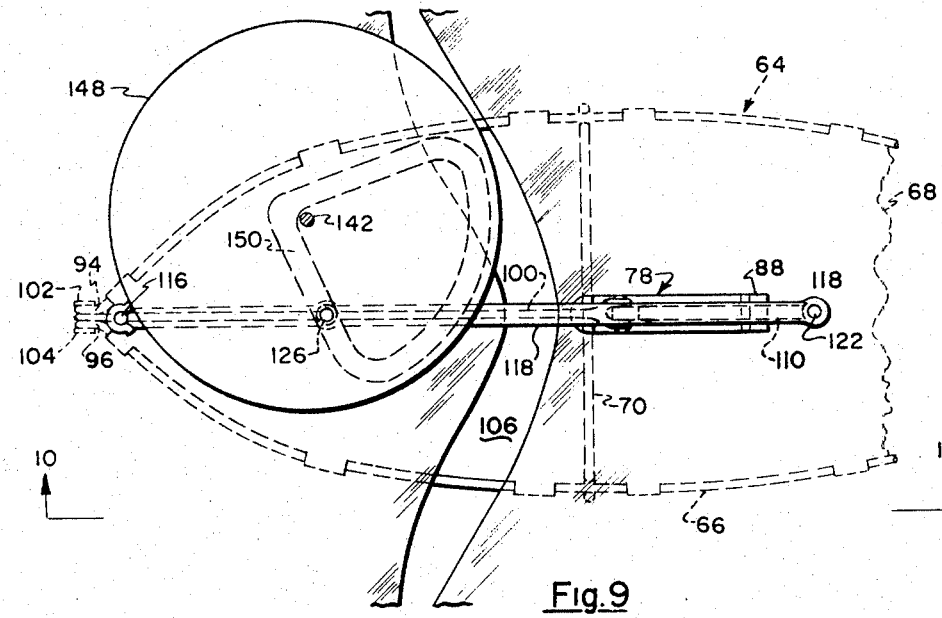
FIG. 9 represents a view similar to FIG. 7 but showing the hammock assembly in the middle position of its horizontal oscillation.
Figure 10:
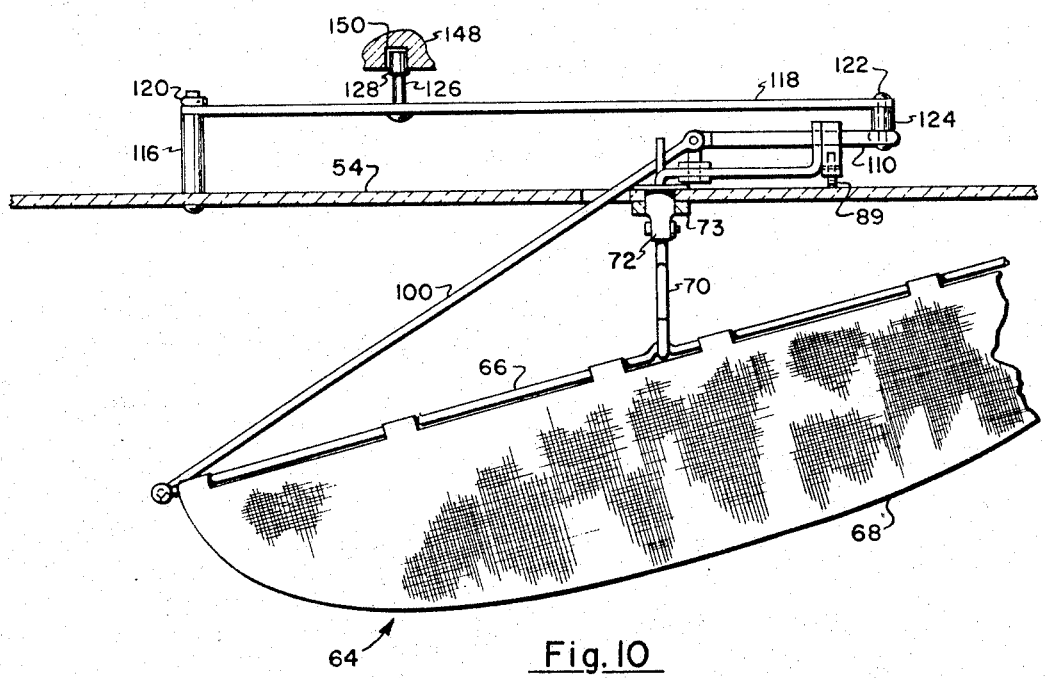
FIG. 10 represents a view in side elevation of the apparatus of FIG. 9 taken along line 10—10 therein looking in the direction of the arrows.

Referring next to FIGS. 7 and 8, it is seen that when hammock assembly 64 is in one extreme position of its horizontal oscillation the end of the assembly whereto stroking rod 100 is connected, this end being considered the head end, is fully raised; that is, the hammock assembly is in one extreme position of its vertical rocking. Referring next to FIGS. 9 and 10, the drive mechanism of the present invention has been operated to bring the hammock assembly around to the middle position of its horizontal oscillation. Now the head end of the hammock assembly is fully lowered; that is, the hammock assembly is in an extreme position of its vertical rocking opposite to the one shown in FIG. 8. Referring next to FIGS. 11 and 12, the drive mechanism has been operated further to bring hammock assembly 64 around to the extreme position of its horizontal oscillation opposite to the one shown in FIG. 7. Now the head end of the hammock assembly is fully raised; that is, the hammock assembly is in the same position of its vertical rocking as the one shown in FIG. 8.

From the foregoing it may be observed that in going from its positions or orientations shown in FIGS. 7 and 8 to those shown in FIGS. 11 and 12, hammock assembly 64 has been put through a half cycle of horizontal angular oscillation and a full cycle of vertical rocking. Continued operation of the drive mechanism would bring hammock assembly 64 back to its positions shown in FIGS. 9 and 10, and still further operation would restore this assembly to its positions shown in FIGS. 7 and 8. Thirty cycles per minute of horizontal oscillation and sixty cycles per minute of vertical rocking are preferably provided. The preferred angular range of horizontal oscillation of hammock assembly 64 is at least about one hundred and twenty degrees (120°) side to side, and its preferred angular range of vertical rocking is at least about thirty degrees (30°), the latter range desirably being divided about equally fifteen degrees above and fifteen degrees below the horizontal so far as either end of the hammock assembly is concerned. These ranges of angular oscillating and/or rocking motion are about the minimum needed to achieve satisfactory stimulation of the entire vestibular apparatus of an infant lying in hammock member 68. About one cycle per minute (1 c.p.m.) is the minimum frequency of oscillation or rocking either horizontally or vertically that may be expected to be of significant benefit to an infant. Maximum frequencies are limited by the reasonable capabilities of the drive mechanism and structure of any particular actual embodiment of the illustrated apparatus, any by considerations of disturbance of the infant in the hammock on account of unduly high accelerations.

As hereinbefore described, the vestibular apparatus is comprised of curved canal structures. These structures are designated according to their arrangement as the anterior, posterior, and external. They intersect and each is perpendicular to the other two, the arrangement being somewhat similar to a corner of a box. The vestibular apparatus is located in the vicinity of the inner ear, and any tilting of the head causes a tilting of the apparatus. When an infant is viewed in the plane position while resting on his back in hammock assembly 64 with his head toward connecting pin 98 and at the same time motion in a pattern as set forth previously is imposed upon the hammock assembly, the infant's head assumes a sinuous continuum of tilting positions.

Referring now to FIGS. 7 and 8, and looking toward the left with the mid-line axis of incubator 20 being taken as parallel to its side panels 42 and 44, the head of the hammock assembly 64 at connecting pin 98 is oriented essentially 60° to the left of the mid-line axis and 15° above the plane of incubator deck 28. The infant's head is tilted so that the anterior canal structure is tilted forward 15° and downward; the external canal structure is tilted downward; the posterior canal structure is tilted forward and downward 15°, and all three structures are tilted inwardly towards the mid-line axis. Referring next to FIGS. 9 and 10, the head of the hammock assembly is oriented essentially 15° below the plane of deck 28 and is at the mid-line axis of incubator 20. The infant's head is tilted backwards so that the anterior canal structure of the vestibular apparatus stays in the vertical position but is tilted backwards 15°; the external canal structure is also tilted backwards, and so is the posterior canal structure. Referring next to FIGS. 11 and 12, the head of the hammock assembly is oriented essentially 60° to the right of the mid-line axis and 15° above the plane of deck 28. The canal structures assume positions as in FIGS. 7 and 8 but with the exception that in FIGS. 7 and 8 all three structures tilt inwardly towards the mid-line axis from the left while in FIGS. 11 and 12 all three structures tilt inwardly towards it from the right.

From this third position indicated in FIGS. 11 and 12, the hammock assembly is swung into its position of FIGS. 9 and 10, and then into its position of FIGS. 7 and 8, from there returned to its position of FIGS. 9 and 10, and then swung into its position of FIGS. 11 and 12, this motion pattern providing the desired sinuous continuum of tilting positions of the infant's head with a concomitant tilting of each of the structures which the vestibular apparatus comprises so that each has assumed three different positions in relation to a mid-plane and a mid-axis. Thus, this motion pattern extends through sufficient yet approximately minimal angular ranges needed to change the plane locations of all the structures within the vestibular apparatus and to concomitantly stimulate the vestibular cells within the total vestibular apparatus structure.

In a customary mode of utilization of the apparatus of the present invention as so far illustrated and described, particularly taking it in its condition shown in FIGS. 1, 2 and 3, and assuming the infant to be treated to be already within the incubator, access is achieved through ports 46, 48, 50 and 52 as most convenient to release hammock assembly 64 from yoke 70 and vertical stroking rod 100. Release may be effected in part by pivoting the hammock assembly up and around connecting pin 98 until the jogged regions of hammock frame 66 are raised somewhat from the interior bottom surfaces of the U-bends on the legs of yoke 70, and then pushing the hammock assembly forward with respect to the yoke and the vertical stroking rod to disengage spring clips 94 and 96 from pin 98 and hence from stroking rod 100. Thereafter, release is effected additionally by further lifting of the hammock assembly, with the edges of hammock 68 itself deflecting inwardly or outwardly as necessary, until at least one side of hammock frame 66 is above the outer end of the U-bend of the maching yoke leg; then springing this frame side outwardly clear of the U-bend, and swinging it down past the U-bend. With one side of hammock frame 66 completely clear of yoke 70, the other side is lifted easily and otherwise moved clear also, and the whole hammock assembly 64 is lowered down onto mattress 36 alongside the infant.

The infant to be treated is then placed in the hammock assembly with his head preferably toward the end of the assembly which is to be connected to pin 98 on stroking rod 100. The hammock assembly with the infant in it is lifted up carefully and reengaged with yoke 70 and vertical stroking rod connecting pin 98 using a procedure essentially the reverse of the release procedure described above.

Motor 132 is then energized and the desired compound motion of the cradle comprising an angular horizontal oscillation and vertical rocking is started. At the end of the desired period of imposing motion upon the infant, motor 132 is stopped and the infant and the hammock assembly are lowered down onto mattress 36. The infant may then receive any other prescribed care in his continuously controlled atmosphere; or, if desired, he may be removed from the incubator entirely after swinging back enclosure 24 on hinge 26.

Referring next to FIGS. 13, 14 and 15, a Plexiglas incubator enclosure 224, only the upper portion of which is shown but which may be assumed to be supported on a conventional base structure not shown, is provided on the upper surface of its top panel 254 with a channel-like frame 256. Top panel 254 itself is entirely cut away within the inner boundaries of this frame. Otherwise, incubator enclosure 224 is to be understood as being similar in all respects to enclosure 24, just as channel-like frame 256 is similar to channel-like frame 56. Surmounting incubator enclosure 224 with its edges resting on a gasket in the groove of frame 256 is a Plexiglas drive mechanism enclosure 258 having lifting handles 352. Enclosure 258 is removably attached to channel-like frame 256 by flange and thumb screw means just as enclosure 58 is attached to frame 56. A downwardly-jogged transverse member 354 is attached at either end to opposite interior wall surfaces of enclosure 258, and extends substantially normally to the longitudinal axis of incubator enclosure 224. In its central region, member 354 lies essentially in the plane of incubator enclosure top panel 254 when drive mechanism enclosure 258 is duly set in place and fastened down on frame 256 as shown.

A framed hammock assembly 264 is pivotally suspended within incubator enclosure 224 by means of a yoke 270. The drive mechanism for hammock assembly 264 and its suspension yoke in the embodiment of this invention illustrated in FIGS. 13, 14 and 15 is just the same so far as working parts are concerned as the drive mechanism for framed hammock assembly 64 and yoke 70 in the earlier-described inventive embodiment, except that the mechanism in the second or presently-considered embodiment is mounted on or otherwise entirely supported from the Plexiglas drive mechanism enclosure, that is, it is mounted entirely independently of the incubator enclosure, and indeed so are hammock assembly 264 and yoke 270 themselves. In particular, journal member 272 rests on transverse member 354 and passes rotatably downwardly through a hole in this member and bearing collar 273 affixed to the underside of the member; the roller corresponding to roller 89 in bearing member 88 affixed to turning member 78 rides on the upper surface of transverse member 354, and cradle stroking arm 318 is pivotally mounted at one end on a bracket or support piece 356 extending inwardly from the inner surface of panel 336 of drive mechanism enclosure 258. It may be made out clearly from FIGS. 13, 14 and 15 that upon thumb screws 262 being loosened and removed, drive mechanism enclosure 258 and all of the drive mechanism, the suspension yoke 270, and the framed hammock assembly 264, may be lifted up and away from incubator enclosure 224 by means of lifting handles 352 and carried over to and installed upon an incubator having a similar enclosure, that is, an enclosure provided with a channel-like frame similar to frame 256 and with its top panel entirely cut away within the inner boundaries of this frame. Thus the apparatus embodiment of the present invention shown in FIGS. 13, 14 and 15 is of a quickly and easily transferable nature, and so a single such embodiment may be used to serve a multi-incubator nursery.

Referring to FIG. 16 in connection with FIGS. 13, 14 and 15, when drive mechanism enclosure 258 and its enclosed and otherwise associated machinery are lifted away from any particular incubator enclosure 224 a rectangular aperture is left in top panel 254 of that enclosure which must be covered if a conditioned atmosphere is to be maintained in the incubator. A cover plate assembly 358 is provided for this purpose. This assembly comprises a plate member 360 to the upper surface of which are affixed a pair of lifting handles 362. On the lower surface of plate member 360 is affixed a downwardly extending, rectangularly configured rim or flange 364, somewhat within the periphery or boundary of the plate member. The sizing and shaping of rim 364 is such that it will just fit down within the groove in channel-like frame 256. Clear holes are provided in the peripheral portion of plate 360 beyond rim 364 for appropriate alignment with the tapped holes in frame 256 when plate assembly 358 is set in place on the channel-like frame. Thumb screws 262 are then re-installed and tightened down on the peripheral portion of plate member 360 to cause rim or flange 364 to bear firmly upon the gasket in the groove of frame 256, and thus not only close but also seal the rectangular aperture in top panel 254 of the incubator enclosure. Just as drive mechanism enclosure 258 and the mechanism and the hammock assembly mounted in and on or otherwise supported from it may be moved from one incubator to another as needed, so also may cover plate assembly 358.

Besides fitting onto an incubator enclosure 224, drive mechanism enclosure 258 and the mechanism and the hammock assembly mounted in and on or otherwise supported from it may also fit onto a simple structure mounted on and above a bassinet or crib. Such a support arrangement on a substantially firm and compatibly fitting structure may be desired when the controlled atmosphere of an incubator is not needed. A suitable structure might, for example, have the form of top panel 254 of incubator enclosure 224 provided with a channel-like frame 256 on its upper surface, and a leg or stanchion extending downwardly from each corner of its lower surface.

Referring now to FIGS. 17 and 18 in which another apparatus embodiment of this invention is shown, in these figures a framed hammock assembly 464 comprising a hammock frame 466 and a hammock member 468 is shown suspended beneath the top panel 454 of an incubator which is generally designated 420.

Incubator 420 is of a substantially conventional nature and generally corresponds to incubator 20 shown in and described above with reference to FIGS. 1 and 2. It has a base structure generally designated 422 hingedly attached by means of piano-type hinges to an enclosure 424 which may be of Plexiglas. Enclosure 424 has access ports 446, 448, 450 and 452 in its sides for use in handling the infant, for example, which ports are normally closed by flexible sleeves, and the bottom edges of enclosure 424 fit into a groove running all around the deck 428 of the base structure 422. Within the groove there is a gasket (not shown) which, as compressed by the weight of enclosure 424 and the structure mounted on this enclosure forms a substantially gas-tight seal between the enclosure and base structure 422. A mattress 436 rests on deck 428. Chains 432 and 434 are connected between base structure 422 and enclosure 424 at either end of incubator 20 and limit the extent to which the enclosure can be rotated up and back away from the base structure on the piano-type hinges.

Referring still to FIGS. 17 and 18 and now also to FIGS. 19–22 as necessary, in this embodiment of the invention hammock assembly 464 is pivotally mounted within the incubator on a yoke 470 suspended from a rotatable journal member 472, and includes a frame 466 which passes through a plurality of loops along the upper edge of hammock member 468. Member 468 may be of canvas or other suitably strong yet pliable material, and the length of assembly 464 from end to end is such that it can accommodate a human infant in a semi-fetal position.

Journal member 472 is rotatably mounted within the top panel 454 of incubator 420 and also within a bearing member 473 affixed to the bottom panel of enclosure 458. Member 472 has a snug-fitting sealing collar 471, preferably of a resilient material such as rubber, about its cylindrical portion and resting on the top panel 454 of the incubator. Sealing collar 471 mitigates against undesired atmospheric leakage into or out of the incubator when enclosure 458 is mounted upon the incubator.

Journal member 472 comprises an upper, plate-like portion 475 and a lower cylinder-like portion 477 having a diameter somewhat smaller than that of its upper portion 475. The lower portion of journal member 472 extends downwardly through a hole in top panel 454 of incubator enclosure 424, in which hole member 472 has a close but free-turning fit. The upper plate-like portion of the journal member rests on the upper surface of the bottom panel of enclosure 458 and thereby provides support for the whole journal member and for the parts and assemblies suspended from it.

In its extent below panel 454, journal member 472 is drilled transversely to accommodate a thumbscrew 474 which projects oppositely beyond the journal member. The stem of yoke 470 is drilled transversely with a hole corresponding in diameter to that in journal member 472 which is disposed to come into alignment with the latter hole when the yoke stem is pushed up and about the journal member. Thumbscrew 474 may then be screwed transversely through both journal member 472 and the cup-shaped stem of yoke 470 to suspend the yoke from the journal member.

As may be seen particularly in FIG. 19, journal member 472 is surmounted by and has fixedly attached to it a crank or turning member generally designated 478. Crank member 478 comprises two substantially horizontal leg portions 480 and 482, which are each bent down at one end to attach to the top of journal member 472, and an upwardly extending trunk or flange portion 484. Leg portions 480 and 482 are separated by a slot 486 of determinate width. A bearing member 488 is attached by screws to the outer surface of the trunk portion 484 of crank member 478 and there is a hole through portion 484 of essentially the same size as and in accurate axial alignment with a hole in the bearing member. This continuous hole is located essentially centrally with respect to slot 486. Mounted rotatably within bearing member 488 and extending below it is a roller member 489 which may have the structure of a ball bearing. Roller member 489 rides on the upper surface of the bottom panel of enclosure 458 and provides support for the portion of turning member 478 overhung beyond journal member 472. An arcuate metal strip, not shown, may be provided on the upper surface of the panel on which roller member 489 rests to act as a track for the roller member. Upright guide members 490 and 492 are fixedly attached to leg portions 480 and 482 just about where these portions bend down to be joined to journal member 472. It will be appreciated that when a turning motion in a horizontal plane is imposed upon crank 478, a turning motion will also be transmitted to yoke 470 through journal member 472 and from the yoke to hammock assembly 464.

As may be seen particularly in FIGS. 19, 20 and 22, connected to one end of hammock frame 466 and passing within rotatable journal member 472 is a cord-like stroking line 401 which is preferably nylon but may be a chain, cord, wire or the like. The other end of stroking line 401 is connected to one end of stroking rod 410 which has a close sliding fit with and passes through the continuous hole in bearing member 488 and flange or trunk portion 484 of crank member 478. An alignment maintenance or crosshead slider structure 414, formed integrally with a cross-head member 408 and including a vertical element which extends downwardly from crosshead member 408 through slot 486 between crank leg portions 480 and 482 is also provided. The vertical element of slider structure 414 has a close sliding fit with respect to the edge surfaces of leg portions 480 and 482 which define slot 486. Structure 414 also comprises two horizontal elements which are affixed to the vertical element respectively above and below the crank member leg portions 480 and 482, and have close sliding fits on the upper and lower surfaces of these crank member leg portions.

Stroking-line 401 passes over a sheave wheel 491 rotatably mounted between guide members 490 and 492 and enters an opening 479 in journal member 472. Within the tubular portion of journal member 472, stroking-line 401 passes over sheave wheels 493 and 495 rotatably mounted on the inner wall of the journal member and also passes through an opening 497 through journal member 472 and the stem of yoke 470. One end of stroking-line 401 is secured to one end of hammock frame 466 by, for example, tying the stroking-line to the thumbscrew 403 joining the ends of the hammock frame 466, or as shown in FIG. 22, by providing a tab member 402 at the end of the stroking-line and compressing the stroking-line between the ends of the hammock frame by suitable tightening of thumbscrew 403.

Rather than yoke 470 being at the midpoint of the end to end length of hammock frame 466, it is preferably slightly off-center, with stroking-line 401 attached to the longer of the two portions of the hammock frame. This extra length and the fact that an infant's head normally constitutes about one-third of an infant's total body weigh, provides a heavier portion of the hammock toward the end to which the stroking-line is attached which facilitates adapting the hammock assembly 464 to the compound motion of this invention. An off-center suspension of the hammock assembly by its supporting yoke is also preferable in the embodiments of this invention described in the forepart of this application with reference to FIGS. 1 and 2 and FIGS. 13 and 14.

A motor 431 having a motor control knob 433 is mounted on top of enclosure 458 such that its motor output shaft 435 extends through the top panel of the enclosure. Motor 431 is preferably an electric motor of explosion-proof construction, but it may also be an equivalent motive means, such as a hand-crank provided with shaft such as shaft 435. Motor shaft 435 has a spur gear 447 on its end which meshes with a ring gear 445 rotatably mounted in the top wall of enclosure 458 by means of a pivot support 441. One end of a stroking-link 404 is pivotally mounted to the underside of ring gear 445, the other end of the link being pivotally connected to stroking arm 418. Stroking-link 404 is preferably connected to ring gear 445 at a distance from the ring gear's rim equal to about one-third of the diameter of the ring gear.

It may be seen that as motor 431 turns, output shaft 435 rotates spur gear 447 which in turn moves ring gear 445 in the same direction. It may further be seen that as ring gear 445 rotates the end of stroking-link 404 which is connected to gear 445 moves toward and then away from a reference line between the axes of pivot post 416 and journal member 472, thereby moving the end of stroking arm 418 which is connected to stroking rod 410 toward and then away from said reference line. This stroking arm swings back and forth through an arc which is preferably more or less equally divided on either side of this reference line.

Stroking arm pivot post 416 is mounted on and extends from the bottom panel of enclosure 458 and provides pivotal support for one end of stroking arm 418. Arm 418 may be retained on this post by means of a snap ring (not shown). The other end of arm 418 is pivotally connected to the end of horizontal stroking rod 410 by means of a pivot pin 421 and a spacer sleeve 423. It may be seen that as arm 418 is pivoted horizontally in one direction and then the other about pivot post 416, horizontal stroking rod 410 will be moved through bearing member 488 alternately toward and away from the vertical pivot axis of journal member 472, and horizontal stroking rod 410 will at the same time impose an alternating torque on crank member 478 which will cause turning motion of journal member 472 and yoke 470 first one way and then the other. The turning motion of yoke 470 causes horizontal angular oscillation of hammock assembly 464 and, assuming that vertical stroking-line 401 is connected between hammock frame 466 and stroking rod 410, the sliding motion of rod 410 first one way and then the other through bearing 488 will cause the stroking-line to be pulled and then relaxed, thereby causing hammock assembly 464 to be rocked up and down about its pivot points on the U-bends of the legs of yoke 470. Thus an overall compound motion comprising horizontal oscillation through an arc and vertical rocking is provided to the framed hammock and thereby also to any infant lying within it.

When in use, enclosure 458 is mounted on incubator 420 by means of suction cups 499 under each of the four corners of the enclosure. Upon detachment of yoke 470 and hammock assembly 472 by disengagement of thumb-screw 474, enclosure 458 may be lifted off incubator 420 by means of a pair of handles 451, whereupon it may be carried to and mounted on a second incubator. Suction cups 499 prevent sliding of enclosure 458 and also facilitate mounting and demounting of the enclosure on an incubator.

It will be apparent to those skilled in the art that one advantage of this embodiment of the present invention is the ease with which it can be transported from one incubator in a nursery to another, and that a second advantage is that most incubators do not have to be modified in any way to receive the apparatus of this embodiment, as most incubators already have a hole in their top panel suitable for receiving journal member 472.

With a hammock frame 466 which is about 5½ inches wide and 5 inches deep and about 13 inches or 18 inches long, or long enough to accommodate the infant, satisfactory operation has been obtained with this embodiment of the invention with a ring gear 445 about 4 inches in diameter, a stroking-link 404 about 4 inches in length pivotably connected to a 10½ inch stroking arm 418 about 3¾ inches from pivot post 416, and a turning member 478 and bearing member 488 having a combined length of about 4½ inches. An enclosure 458 about 5 inches high and 12½ inches in length and breadth has been found adequate to contain the apparatus to be mounted within it. (The various members shown in FIGS. 17–22 are not necessarily drawn to scale.) It is thus seen that the apparatus required for practising this invention in the manner of this embodiment is relatively compact as well as readily mounted and demounted on an incubator or over a crib.

From place to place in the foregoing description of the present invention the expression "rocking" has been used in connection with alternating angular motion of a hammock assembly in a vertical plane, while the expression "oscillating" has been used in connection with alternating angular motion of a hammock assembly in a horizontal plane. It is to be understood that these two expressions have been used only for the sake of convenience and clarity in identifying and distinguishing particular motions which may be components of a compound motion. For purposes of this specification, including its claims, the expression "rocking" is to be considered generic; that is, it is to be considered to relate to motions sometimes described as "oscillating" as well as to those particularly described as "rocking," and further to relate to compound motions.

Protection by Letters Patent of this invention in all its aspects as the same are defined in the appended claims is sought to the greatest extent that the prior art allows.

What is claimed is:

1. An apparatus for rocking a human being, said apparatus comprising (1) a full body support means for a human being in a substantially prone position; (2) suspension means for said full body support means; and (3) means for imposing upon said support means a compound motion comprising vertical rocking about a horizontal transverse axis of said support means and simultaneous horizontal oscillation about a vertical axis perpendicular to said transverse axis.

2. An apparatus for rocking a human being according to claim 1 which further comprises an incubator to which said suspension means is mounted and wherewithin said full body support means is suspended.

3. An apparatus for rocking a human being comprising (1) a full body support means for a human being in a substantially prone position, (2) suspension means for said full body support means, and (3) drive means operatively connected to said support means at least through said suspension means for generating a compound motion comprising vertical rocking about a horizontal transverse axis of said support means and simultaneous horizontal oscillation about a vertical axis perpendicular to said transverse axis, and for driving said support means in said compound motion.

4. An apparatus for rocking a human being according to claim 3 in which the angular range of the horizontal oscillation of said full body support means is at least about 120°.

5. An apparatus for rocking a human being according to claim 3 in which the angular range of the vertical rocking of said full body support means is at least about 30°.

6. An apparatus for rocking a human being according to claim 3 in which said suspension means and said drive means are together configured to provide an angular range of vertical rocking of said full body support means substantially evenly divided above and below a horizontal plane.

7. An apparatus for rocking a human being according to claim 3 in which said suspension means and said drive means are together configured to provide two complete cycles of vertical rocking of said full body support means for each complete cycle of horizontal oscillation thereof.

8. An apparatus for rocking a human being, said apparatus comprising (1) full body support means for a human being in substantially prone position, said support means being characterized by a longitudinal centerline axis and a transverse midlength axis both lying normally in a substantially horizontal plane, (2) pivotal suspension means for said full body support means whereon said support means may be rocked around its transverse midlength axis in alternating angular motion and simultaneously oscillated in alternating angular motion about a vertical axis intersecting both said longitudinal centerline and transverse midlength axes, (3) a substantially horizontal panel member wherefrom said pivotal suspension means is suspended and with respect to which it is rotatable about said vertical axis, (4) a turning member attached to said suspension means and extending substantially horizontally therefrom as a crank above the upper surface of said panel member, (5) a horizontal stroking rod having one end and another end and being slidable in and on said turning member along a line essentially radial to said vertical axis, and having its one end nearer to said vertical axis than its other end, (6) a vertical stroking rod having one end and another end and extending through said panel member, and being pivotally connected at its one end to said one end of said horizontal stroking rod and at its other end to said full body support means, (7) a stroking arm having one end and another end, said stroking arm being pivotally mounted at its one end at a point in spaced relation to said vertical axis and being pivotally connected at its other end to said other end of said horizontal stroking rod, and (8) drive means operatively connected to said stroking arm for moving said arm in alternating angular motion about the axis of its pivot mounting on said panel member.

9. An apparatus for rocking a human being according to claim 8 in which said panel member is the top panel of an incubator enclosure.

10. An apparatus for rocking a human being according to claim 8 in which the pivot mounting of said stroking arm on said panel member is in such spaced relation to the vertcial axis of said pivotal suspension means that said stroking arm and said horizontal stroking rod may be brought into parallel relation with said stroking arm overlying said horizontal stroking rod.

11. An apparatus for rocking a human being according to claim 8 in which said pivotal suspension means comprises a lower yoke portion in engagement with said full body support means and an upper journal portion passing through said panel member.

12. An apparatus for rocking a human being according to claim 8 in which the lower yoke portion and upper journal portion of said pivotal suspension means are detachably connected in torque transmitting relationship.

13. An apparatus for rocking a human being according to claim 8 in which said full body support means comprises a hammock assembly including a frame portion detachably connected to said pivotal suspension means and a flexible material portion hung from and stretching across said frame portion.

14. An apparatus for rocking a human being, said apparatus comprising (1) full body support means for a human being in substantially prone position, said support means being characterized by a longitudinal centerline axis and a transverse midlength axis both lying normally in a substantially horizontal plane, (2) pivotal suspension means for said full body support means whereon said support means may be rocked around its transverse midlength axis in alternating angular motion and simultaneously oscillated in alternating angular motion about a vertical axis intersecting both said longitudinal centerline and transverse midlength axes, (3) a first enclosure having a substantially horizontal top panel wherefrom said pivotal suspension means is suspended and with respect to which it is rotatable about said vertical axis, said first enclosure being of sufficient size to allow rocking and oscillating motion of said full body support means within it, (4) a turning member attached to said suspension means and extending substantially horizontally therefrom as a crank above the upper surface of said top panel member, (5) a horizontal stroking rod having one end and another end and being slidable in and on said turning member along a line essentially radial to said vertical axis, and having its one end nearer to said vertical axis than its other end, (6) a vertical stroking rod having one end and another end and extending through said top panel of said first enclosure, and being pivotally connected at its one end to said one end of said horizontal stroking rod and at its other end to said full body support means, (7) a stroking arm having one end and another end, said stroking arm being pivotally mounted at its one end at a point in spaced relation to said vertical axis and being pivotally connected at its other end to said other end of said horizontal stroking rod, (8) a second enclosure mounted on and above said top panel of said first enclosure, said second enclosure enclosing any portion of said pivotal suspension means extending above said top panel, as well as said turning member, said horizontal stroking rod, said stroking arm, and the portion of said vertical stroking rod above the top panel of said first enclosure, and (9) drive means operatively connected to said stroking arm for moving said arm in alternating angular motion about the axis of its pivot mounting on said top panel member, said drive means including (i) a cam rotatably mounted to said second enclosure, (ii) a cam follower mounted on said stroking arm and in working engagement with said cam, and (iii) means for imposing rotational motion on said cam.

15. An apparatus for rocking a human being according to claim 14 in which said means for imposing rotational motion on said cam is mounted on said second enclosure.

16. An apparatus for rocking a human being according to claim 14 in which said second enclosure is detachably mounted on said first enclosure and in which further said cam and said cam follower are separable from said first enclosure with said second enclosure upon detachment of said second enclosure from said first enclosure.

17. An apparatus for rocking a human being according to claim 16 wherein the upper surface of the top panel of said first enclosure has a groove wherein said second enclosure is seated.

18. An apparatus for rocking a human being, said apparatus comprising (1) an enclosure substantially open on one side, (2) a transverse member extending at least part way across the open side of said enclosure from an interior wall surface thereof, said transverse member being characterized by an opening in the nature of a bearing opening, (3) a journal member rotatably mounted in the bearing opening in said transverse member and extending through and oriented in said transverse member so that its axis of rotation is substantially normal to the open side of said enclosure, (4) a turning member attached to said journal member and extending substantially radially therefrom as a crank, (5) a first stroking rod having one end and another end and being slidable in and on said turning member along a line essentially radial to the axis of rotation of said journal member, (6) a suspension member attached to said journal member in torque transmittable relation therefrom and extending generally outwardly away from said enclosure, (7) full body support means for a human being in substantially prone position, said support means being characterized by a longitudinal centerline axis and a transverse midlength axis and being mounted on said suspension member to be rockable in alternating angular motion about its transverse midlength axis with this axis being oriented essentially perpendicularly to the axis of rotation of said bearing member, (8) a second stroking rod having one end and another end and being pivotally connected at its one end to said one end of said first stroking rod and at its other end to said full body support means, (9) a stroking arm having one end and another end, said arm being pivotally mounted on and from an interior wall surface of said enclosure at its one end and being pivotally connected at its other end to said other end of said first stroking rod, (10) and drive means mounted on and at least partly within said enclosure and operatively connected to said stroking arm for moving said arm in alternating angular motion about the axis of its pivot mounting on said enclosure.

19. An apparatus for rocking a human being according to claim 18 in which the pivot mounting of said stroking arm on said enclosure is in such spaced relation to the axis of rotation of said journal member that said stroking arm and said first stroking rod may be brought into parallel relation with said stroking arm overlying said first stroking rod.

20. An apparatus for rocking a human being according to claim 18 in which said suspension member comprises a yoke having legs extending generally outwardly away from said enclosure and a stem extending inwardly toward said enclosure and in which said journal member has an axial recess within which the stem of said yoke is removably fitted.

21. An apparatus for rocking a human being according to claim 18 in which said full body support means has one end and another end, and said second stroking rod is detachably connected at its other end to said one end of said full body support means.

22. An apparatus for rocking a human being according to claim 18 in which said drive means includes a cam rotatably mounted in and on said enclosure, a cam follower mounted on said stroking arm and in working engagement with said cam, and means for imposing rotational motion on said cam.

23. An apparatus for rocking a human being according to claim 22 in which said means for imposing rotational motion on said cam comprises a motor mounted on said enclosure.

24. A process for rocking a human being, said process comprising the steps of (1) imposing a rocking motion upon a human being about a horizontal axis transverse to the axis between the head and feet of the human being, and (2) simultaneously imposing a horizontal oscillating motion upon the human being about a vertical axis perpendicular to the said transverse axis.

25. A process for rocking a human being according to claim 24 in which the axes of oscillating motion and rocking motion intersect at about the midlength of the human being.

26. A process for rocking a human being, said process comprising the steps of (1) imposing upon an infant human being within an incubator a rocking motion about a horizontal axis transverse to the axis between the head and feet of the human being, and (2) simultaneously imposing a horizontal oscillating motion upon the human being about a vertical axis which is perpendicular to the said transverse axis, and which intersects the said transverse axis at about the midlength of the human being.

27. A process for rocking a human being according to claim 26 in which the angular range of oscillating motion is at least about 120°.

28. A process for rocking a human being according to claim 26 in which the angular range of rocking motion is at least about 30°.

29. A process for rocking a human being according to claim 26 in which the angular range of rocking motion is substantially evenly divided above and below a horizontal plane.

30. A process for rocking a human being according to claim 26 in which two complete cycles of rocking motion are imposed for each complete cycle of oscillating motion.

31. A process for rocking a human being according to claim 26 in which the frequency of the compound oscillation motion and the rocking motion is at least about one cycle per minute.

32. An apparatus for rocking a human being, said apparatus comprising (1) full body support means for a human being in substantially prone position, said support means being characterized by a longitudinal centerline axis and a transverse midlength axis both lying normally in a substantially horizontal plane, (2) pivotal suspension means for said full body support means whereon said support means may be rocked around its transverse midlength axis in alternating angular motion and simultaneously oscillated in alternating angular motion about a vertical axis intersecting both said longitudinal centerline and transverse midlength axes, (3) a substantially horizontal panel member wherefrom said pivotal suspension means is suspended and with respect to which it is rotatable about said vertical axis, (4) a turning member attached to said suspension means and extending substantially horizontally therefrom as a crank above the upper surface of said panel member, (5) a stroking rod having one end and another end and being slidable in and on said turning member along a line essentially radial to said vertical axis, and having its one end nearer to said vertical axis than its other end, (6) a stroking-line having one end and another end, and having its one end connected to said one end of said stroking rod and its other end connected to said full body support means, (7) a stroking arm having one end and another end, said stroking arm being pivotally mounted at its one end at a point in spaced relation to said vertical axis and being pivotally connected at its other end to said other end of said stroking rod, and (8) drive means operatively connected to said stroking arm for moving said arm in alternating angular motion about the axis of its pivot mounting on said panel member.

33. An apparatus for rocking a human being according to claim 32 in which said panel member is the top panel of an incubator enclosure.

34. An apparatus for rocking a human being according to claim 32 in which the pivot mounting of said stroking arm on said panel member is in such spaced relation to the vertical axis of said pivotal suspension means that said stroking arm and said stroking rod may be brought into parallel relation with said stroking arm overlying said stroking rod.

35. An apparatus for rocking a human being according to claim 32 in which said pivotal suspension means comprises a lower yoke portion in engagement with said full body support means and an upper journal portion passing through said panel member.

36. An apparatus for rocking a human being according to claim 32 in which said stroking-line passes within the upper journal portion of said pivotal suspension means.

37. An apparatus for rocking a human being according to claim 32 in which the lower yoke portion and upper journal portion of said pivotal suspension means are detachably connected in torque transmitting relationship.

38. An apparatus for rocking a human being according to claim 32 in which said full body support means comprises a hammock assembly including a frame portion detachably connected to said pivotal suspension means and a flexible material portion hung from and stretching across said frame portion.

39. An apparatus for rocking a human being, said apparatus comprising (1) full body support means for a human being in substantially prone position, said support means being characterized by a longitudinal centerline axis and a transverse midlength axis both lying normally in a substantially horizontal plane, (2) pivotal suspension means for said full body support means whereon said support means may be rocked around its transverse midlength axis in alternating angular motion and simultaneously oscillated in alternating angular motion about a vertical axis intersecting both said longitudinal centerline and transverse midlength axes, (3) a first enclosure having a substantially horizontal top panel wherefrom said pivotal suspension means is suspended and with respect to which it is rotatable about said vertical axis, said first enclosure being of sufficient size to allow rocking and oscillating motion of said full body support means within it, (4) a turning member attached to said suspension means and extending substantially horizontally therefrom as a crank above the upper surface of said top panel member, (5) a stroking rod having one end and another end and being slidable in and on said turning member along a line essentially radial to said vertical axis, and having its one end nearer to said vertical axis than its other end, (6) a stroking-line having one end and another end and extending through said top panel of said first enclosure, and having its one end connected to said one end of said stroking rod and its other end connected to said full body support means, (7) a stroking arm having one end and another end, said stroking arm being pivotally mounted at its one end at a point in spaced relation to said vertical axis and being pivotally connected at its other end to said other end of said stroking rod, (8) a second enclosure mounted on and above said top panel of said first enclosure, said second enclosure enclosing at least a portion of said pivotal suspension means extending above said top panel, as well as said turning member, said stroking rod and said stroking arm, (9) drive means operatively connected to said stroking arm for moving said arm in alternating angular motion about the axis of its pivot mounting on said top panel member, said drive means including (i) a first gear means rotatably mounted to said second enclosure, (ii) a second gear means connected to said stroking arm and in working engagement with said first gear means, and (iii) means for imposing rotational motion on said first gear means.

40. An apparatus for rocking a human being according to claim 39 in which said means for imposing rotational motion on said first gear means comprises a motor mounted on said second enclosure.

41. An apparatus for rocking a human being according to claim 39 in which said second enclosure is detachably mounted on said first enclosure and in which further said first and second gear means are separable from said first enclosure with said second enclosure upon detachment of said second enclosure from said first enclosure.

42. An apparatus for rocking a human being, said apparatus comprising (1) an enclosure substantially open on one side, (2) a transverse member extending at least part way across the open side of said enclosure from an interior wall surface thereof, said transverse member being characterized by an opening in the nature of a bearing opening, (3) a journal member rotatably mounted in the bearing opening in said transverse member and extending through and oriented in said transverse member so that its axis of rotation is substantially normal to the open side of said enclosure, (4) a turning member attached to said journal member and extending substantially radially therefrom as a crank, (5) a stroking rod having one end and another end and being slidable in and on said turning member along a line essentially radial to the axis of rotation of said journal member, (6) a suspension member attached to said journal member in torque transmittable relation therefrom and extending generally outwardly away from said enclosure, (7) full body support means for a human being in substantially prone position, said support means being characterized by a longitudinal centerline axis and a transverse midlength axis and being mounted on said suspension member to be rockable in alternating angular motion about its transverse midlength axis with this axis being oriented essentially perpendicularly to the axis of rotation of said bearing member, (8) a stroking-line having one end and another end and being connected at its one end to said one end of said stroking rod and at its other end to said full body support means, (9) a stroking arm having one end and another end, said arm being pivotally mounted on and from an interior wall surface of said enclosure at its one end and being pivotally connected at its other end to said other end of said stroking rod, (10) and drive means mounted on said enclosure and operatively connected to said stroking arm for moving said arm in alternating angular motion about the axis of its pivot mounting on said enclosure.

43. An apparatus for rocking a human being according to claim 42 in which the pivot mounting of said stroking arm on said enclosure is in such spaced relation to the axis of rotation of said journal member that said stroking arm and said stroking rod may be brought into parallel relation with said stroking arm overlying said first stroking rod.

44. An apparatus for rocking a human being according to claim 42 in which said suspension member comprises a yoke having legs extending generally outwardly away from said enclosure and a stem extending inwardly toward said enclosure and in which said journal member has an axial recess within which the stem of said yoke is removably fitted.

45. An apparatus for rocking a human being according to claim 42 in which said stroking-line passes within said journal member.

46. An apparatus for rocking a human being according to claim 42 in which said full body support means has one end and another end, and said stroking-line is detachably connected at its other end to said one end of said full body support means.

47. An apparatus for rocking a human being according to claim 42 in which said drive means includes first gear means rotatably mounted to said enclosure, a second gear means connected to said stroking arm and in working engagement with said first gear means and means for imposing rotational motion on said first gear means.

48. An apparatus for rocking a human being according to claim 47 in which said means for imposing rotational motion on said first gear means comprises a motor mounted on said enclosure.

References Cited

UNITED STATES PATENTS

| 1,420,134 | 6/1922 | Nisle | 5—109 |
| 2,598,532 | 5/1952 | Gibbon | 128—1 |
| 2,869,538 | 1/1959 | Hawk | 128—28 |
| 2,494,746 | 1/1950 | Colston. | |

FOREIGN PATENTS

| 49,508 | 11/1889 | Germany. |
| 663,577 | 12/1951 | Great Britain. |

L. W. TRAPP, *Primary Examiner.*

U.S. Cl. X.R.

5—109; 128—1